United States Patent [19]

Dye et al.

[11] 4,204,249
[45] May 20, 1980

[54] DATA PROCESSING SYSTEM POWER CONTROL

[75] Inventors: Malcolm Dye, Southampton; Richard C. J. Hyde, Chandlers Ford, both of England

[73] Assignee: International Business Machines Corporation, Armonk, N.Y.

[21] Appl. No.: 810,560

[22] Filed: Jun. 27, 1977

[30] Foreign Application Priority Data

Jun. 30, 1976 [GB] United Kingdom ............... 27318/76

[51] Int. Cl.² ............................................. G06F 11/00
[52] U.S. Cl. ..................................... 364/200; 307/64; 364/492; 371/15
[58] Field of Search ... 364/200 MS File, 900 MS File, 364/492; 318/567, 565; 307/64, 65, 43; 235/301; 324/73 R

[56] References Cited

U.S. PATENT DOCUMENTS

| | | | |
|---|---|---|---|
| 3,736,569 | 5/1973 | Bovricius et al. | 364/200 |
| 3,828,321 | 8/1974 | Wilber et al. | 364/200 |
| 3,842,249 | 10/1974 | Geyer et al. | 364/492 |
| 3,863,270 | 1/1975 | Haley et al. | 364/492 |
| 3,909,801 | 9/1975 | Tokura et al. | 364/900 |
| 3,921,141 | 11/1975 | Wilber et al. | 364/200 |
| 3,928,830 | 12/1975 | Bellamy | 235/304 |
| 3,972,470 | 8/1976 | Takagi | 364/492 |
| 4,016,408 | 4/1977 | Koetzle | 235/302 |
| 4,075,693 | 2/1978 | Fox et al. | 364/200 |
| 4,077,059 | 2/1978 | Cordi et al. | 364/200 |

OTHER PUBLICATIONS

Clark, IBM TDB, vol. 17, No. 5, Oct. 1974, pp. 1312-1315.

Primary Examiner—Mark E. Nusbaum
Attorney, Agent, or Firm—Frederick D. Poag

[57] ABSTRACT

The data processing system consists of a plurality of interconnected data processing subsystems one of which is a service subsystem devoted to servicing the remainder of the system and provides communication between the operator and the system to facilitate maintenance. A plurality of power supply units provide electrical power for the system, together with power supply means dedicated to the service subsystem to start up.

The service subsystem includes a power adapter unit with measuring and logic circuits which cooperate with a power control microprogram to control and monitor the plurality of power supply units. The power adapter unit collects analog and digital data from the plurality of power supply units and distributes digital data to the plurality of power supply units in a multiplex mode as directed by the power control microprogram.

The basic functions provided are sequencing turn-on and turn-off of the plurality of power supplies, monitoring voltage, temperatures, and air flows of the system and checking the correct operation of the plurality of power supply units.

10 Claims, 17 Drawing Figures

POWER ON SEQUENCING

POWER SYSTEM MONITORING

FIG.6

MESSUB, OPTIONS DEPENDING ON THE SYSTEM CONDITIONS

| | POWER ON SEQUENCE, NO VOLTAGE OUT OF TOLERANCE. | POWER ON SEQUENCE, ANY VOLTAGE OUT OF TOLERANCE. | POWER ON COMPLETE, NO VOLTAGE OUT OF TOLERANCE. | P.O.C., NO VOLTAGE OUT OF TOLERANCE, DISPLAY MODE. | P.O.C., NO VOLTAGE OUT OF TOLERANCE, ADJUST MODE. | POWER ON COMPLETE, ANY VOLTAGE OUT OF TOLERANCE. | P.O.C., ANY VOLTAGE OUT OF TOLERANCE, DISPLAY MODE. | P.O.C., ANY VOLTAGE OUT OF TOLERANCE, ADJUST MODE. |
|---|---|---|---|---|---|---|---|---|
| SMFLG | 0 | 0 | 1 | 1 | 1 | 1 | 1 | 1 |
| MOFLGA | 0 | 0 | 0 | 0 | 1 | 0 | 0 | 1 |
| MOFLGD | 0 | 0 | 0 | 1 | 0 | 0 | 1 | 0 |
| TOLRES | 0 | NOT 0 | 0 | 0 | 0 | NOT 0 | NOT 0 | NOT 0 |
| Flow | 4% TLCK → | 4% TLCK → VOLT. NAME. PR → HIGH/LOW PR → SUAP, RES. PR → 1% TLCK → RES 0? NO (loop) / YES ↓ | 4% TLCK → | 4% TLCK → VOLT. NAME. PR → SUAP, RES. PR → | 4% TLCK → | 4% TLCK → VOLT. NAME. PR → HIGH/LOW PR → SUAP, RES. PR → | 4% TLCK → VOLT. NAME. PR → HIGH/LOW PR → SUAP, RES. PR → | 4% TLCK → VOLT. NAME. PR → HIGH/LOW PR → SUAP, RES. PR → 1% TLCK → RES 0? NO (loop) / YES ↓ |

NOTE:
SMFLG - 0, P.O.S.
1, P.O.C.
MOFLGA - 1, ADJ. MODE
MOFLGD - 1, DISP. MODE
TOLRES -
0, NO ERROR
1, LOW ERROR
2, HIGH ERROR

MESSUB FLOW CHART

MESSUB FLOW CHART

FIG. 8

THMSUB, OPERATIONS DEPENDING ON THE SYSTEM CONDITIONS

| POWER ON COMPLETE, NO TEMP. OUT OF TOLERANCE | P.O.C. NO TEMP. OUT OF TOLERANCE, DISPLAY MODE | POWER ON COMPLETE, ANY TEMP. OUT OF TOLERANCE | P.O.C. ANY TEMP. OUT OF TOLERANCE, DISPLAY MODE | |
|---|---|---|---|---|
| 0<br>0 | 1<br>0 | 0<br>NOT 0 | 1<br>NOT 0 | MOFLGD<br>TOLRES |
| ↓<br>TLCK<br>↓ | ↓<br>TLCK<br>↓<br>TEMP. NAME PR<br>↓<br>SUAP, RES. PR<br>↓ | ↓<br>TLCK<br>↓<br>TEMP. NAME PR<br>↓<br>HIGH/HWC PR<br>↓<br>SUAP, RES. PR<br>↓ | ↓<br>TLCK<br>↓<br>TEMP. NAME PR<br>↓<br>HIGH/HWC PR<br>↓<br>SUAP, RES. PR<br>↓ | NOTE:<br><br>MOFLGD = 1, DISP. MODE<br><br>TOLRES = 0, NO ERROR<br>1, LOW ERROR<br>2, HIGH ERROR |

TLCK FLOW CHART

TLCK FLOW CHART

POWER ON SEQUENCING EXAMPLE

SYSTEM MONITORING EXAMPLE WITH ONE VOLTAGE OUT OF TOLERANCE

SYSTEM MONITORING EXAMPLE WITH ONE VOLTAGE OUT OF TOLERANCE AND ADJUST MODE

CB-TRIP INTERRUPT DURING SYSTEM MONITORING ROUTINE

NORMAL POWER OFF EXAMPLE

DATA PROCESSING SYSTEM POWER CONTROL

FIELD OF THE INVENTION

The present invention relates to a data processor system power supply control.

BACKGROUND OF THE INVENTION

In present data processing systems a logic tree is included to sequence the turn-on or turn-off of the power supplies when the system is started up or shut down. The logic tree is a series of sequential logic circuits arranged to turn on one voltage supply, check that this voltage supply exceeds a predetermined threshold and then turn on the next voltage supply until the whole system is powered. In addition, a meter is included for the service engineer who may switch the meter to various points throughout the system to check that voltage levels are within tolerance.

A description of such a known power control system is given in IBM Maintenance Library Manuals: IBM 3125 Processing Unit, Power Supplies, Order No. SY33-1060-3; IBM 3115 Processing Unit, Power Supplies Order No. SY33-1075-2. (IBM is a Registered Trade Mark of International Business Machines Corporation).

Modern data processing systems have become extremely complex and it would be desirable to implement a power control system having complex control functions in excess of the basic functions mentioned above. Such a sophisticated power supply control system could be implemented by increasing the complexity of the conventional control logic tree. Apart from the cost of this approach, it involves the disadvantage that a logic tree is difficult to change so the system is inflexible. Thus, any change in the power supplies requires a change in wiring of the logic tree or a change in the logic of the tree which may make the implementation of changes expensive and time consuming.

SUMMARY OF THE INVENTION

The object of the present invention is to provide an improved power supply control system.

According to the present invention, data processing apparatus includes a service subsystem and at least one processing subsystem, a plurality of power supply units to provide electrical power to the subsystems together with power supply means dedicated to provide electrical power to enable the service subsystem to start up, the service subsystem including a power control microprogram arranged in operation to control and monitor said plurality of power supply units.

According to another aspect, the present invention provides data processing apparatus comprising a service subsystem and at least one processing subsystem, a plurality of power supply units to provide electrical power to the subsystems together with power supply means dedicated to provide electrical power to enable the service subsystem to start up, the service subsystem, including a microprogram control unit and measuring and logic circuits connected to said power supply units whereby in operation a power control microprogram cooperates with said measuring and logic circuits to control and monitor said plurality of power supply units.

In an embodiment of the invention described, the data processing system consists of a plurality of interconnected data processing subsystems one of which is a service subsystem devoted to servicing the remainder of the system and provides communication between the operator and the system to facilitate maintenance. A plurality of power supply units provide electrical power for the system, together with power supply means dedicated to the service subsystem which provides electrical power to enable the service subsystem to start up.

The service subsystem includes a power adapter unit with measuring and logic circuits which cooperate with a power control microprogram to control and monitor the plurality of power supply units. The power adapter unit collects analog and digital data from the plurality of power supply units and distributes digital data to the plurality of power supply units in a multiplex mode as directed by the power control microprogram.

The basic functions provided are sequencing the turn-on and turn-off of the plurality of power supplies, monitoring voltage, temperatures, and air flows of the system and checking the correct operation of the plurality of power supply units.

The foregoing and other objects, features and advantages of the present invention will be apparent from the following description of a preferred embodiment of the invention as illustrated in the accompanying drawings.

BRIEF DESCRIPTION OF FIGURES

FIG. 6 shows Measurement Sub-Routine MESSUB with options depending on the system conditions.

FIG. 8 shows Thermistor Measurement Sub-Routine THMSUB with options depending on system conditions.

DETAILED DESCRIPTION

Figure 1:
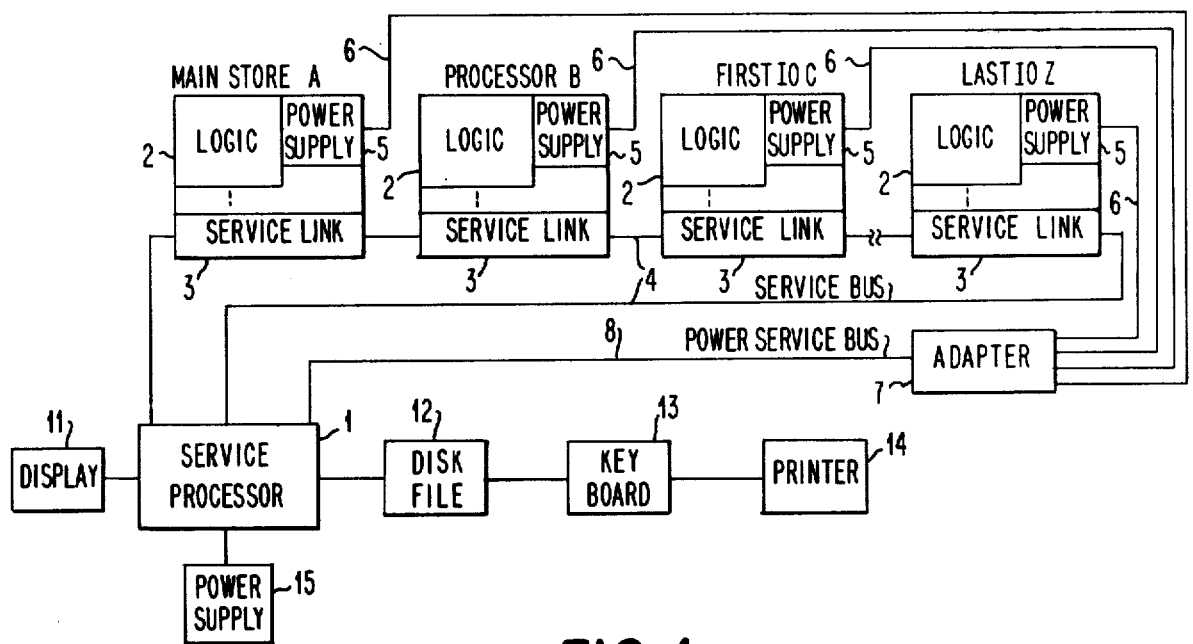
FIG. 1 shows diagrammatically a data processing system including a service processor having a power control adapter to control power supplies according to the present invention.

Referring now to FIG. 1 which includes, as an essential ingredient of the service subsystem a service processor 1. A full description of this service processor will not be given here, and reference may be made to the following publications in which service processors are described suitable for embodiments of the present invention.

IBM Maintenance Library Manuals

IBM 3125 Processing Unit. General System Information, Fourth Edition (August, 1974). Order No. SY33-1059-2

IBM 3125 Processing Unit. Service Processor Subsystem, Fourth Edition (July, 1974). Order No. SY33-1065-2

IBM 3115 Processing Unit. General System Information, Third Edition (April, 1976). Order No. SY33-1088-1

IBM 3115 Processing Unit. Service Processor Subsystem, Third Edition (October, 1976). Order No. SY33-1076-1

Service processor 1 is a slave processor devoted to servicing the system shown in FIG. 1 which consists of a number of interconnected data processors A to Z. Main store A is a semiconductor read/write store which includes a controller to control interval logic during read/write. Processor B could be termed a central processing unit as it performs logical operations upon data supplied from main store A. The remainder of the processors A to Z are concerned with input/output operations and the actual number of processors present depends upon the complexity of the complete system. I/O processor C is a magnetic tape adapter which controls the operation of a number of magnetic tape units. I/O processor D (not shown) is a controller for a number of magnetic disk units. Other I/O processors which may be present are processors controlling card readers, printers, communications channels, etc.

Each processor A to Z includes logic 2 each connected to supply service data to a service link 3. Each service link 3 must be able to communicate with service processor 1 and this is shown schematically by service bus 4 which connects all service links in series with service processor 1.

Each processor or I/O unit A to Z includes an electrical power supply 5 each of which may have several DC voltage levels selected for monitoring. These voltage levels are connected from each power supply by cables 6 to a power control adapter unit 7. Other parameters may be monitored by including a transducer in the processor to convert the parameter to a voltage level. These parameters may be AC voltage and current, temperature, air flow, electric motor speed or any other desired physical parameter. Cable 6 also carries digital status and control data between the processors A-Z and adapter 7. Adapter 7 communicates with service processor 1 via power service bus 8. There is thus provided a service subsystem comprising the processor 1 together with the adapter 7.

As an alternative, each power supply 5 could communicate with service processor 1 via service links 3 and service bus 4, but the individual wiring of power supplies 5 to adapter 7 was found to be more economical for the present system.

Service processor 1 includes a CRT display 11, a magnetic disk file 12, a keyboard 13 and a printer 14. Power supply 15 is dedicated to the service processor and is not monitored by adapter 7 as an independent power supply 15 is required to enable start-up of service processor 1. However, voltage levels, not required to initiate start-up, of the service processor 1 and attachments 11 to 14 could be wired to adapter 7.

Service processor 1 is a microprogram controlled processor with a one byte wide data flow. It performs the following service link communication tasks for the whole system, as described in the aforementioned IBM Maintenance Library Manuals:

(a) Loads microprograms into all processors in the system, including itself.

(b) Provides a link between the operator and the system, (c) Reloads microprograms upon request. Logs error conditions and, subsequently on request, reads them out for analysis.

(d) Provides a service tool for maintenance.

In the system embodying the present invention, service processor 1 performs the following additional tasks for the whole system.

(e) Provides on/off control of the power supplies (excluding the power supply dedicated to the service processor itself) including regulators and contactors and to control these power supplies in the correct sequence for power on, power off and for partial power off it is desired to operate the system in a degraded mode.

(f) Monitors status information presented to it as digital data representing errors in power supplies, thermal switches, auxiliary switches on contactors, or circuit breakers.

(g) Generates status information in digital form representing analog inputs from DC power supplies, or AC current, temperature, and air flow transducers.

(h) Interprets status data to locate failures and out-of-tolerance conditions. Takes corrective or fail-safe action and displays power system status.

(i) Provide the facility, upon request by a maintenance engineer, to display power system status.

The service processor 1 contains an ALU (arithmetic and logic unit), a writable control store and a read only control store. When a start button is pressed, a relay is operated to turn on an AC mains supply to the dedicated power supply 15 to supply the required voltages to service processor 1 and at least disk file 12. The status of power supply 15 is indicated on a panel for maintenance engineer use having a number of light emitting diodes.

The next step is that wired logic in the service processor 1 initiates the read out of a pico-program from the read only control store which instructs the service processor 1 to load a power-on sequence microprogram from disk file 12 into the writable control store. The power-on sequence microprogram is then executed via adapter 7 to turn on cooling fans, switch on A/C DC converter supplying system power supplies 5 and then sequence the turn on of regulators in power supplies 5. At each step, the microprogram checks for the expected power system response. At the end of this microprogram sequence, the whole processing system is powered and checked including portions of the service processor which are not powered initially. A more detailed description of this power-on sequence microprogram is given later in this specification.

With the whole system powered, microprograms stored in disk file 12 are loaded via the service processor 1 into all processors 2 in the system. Subsequent operation of the logic system is as described in the aforementioned IBM Manuals.

Figure 2:
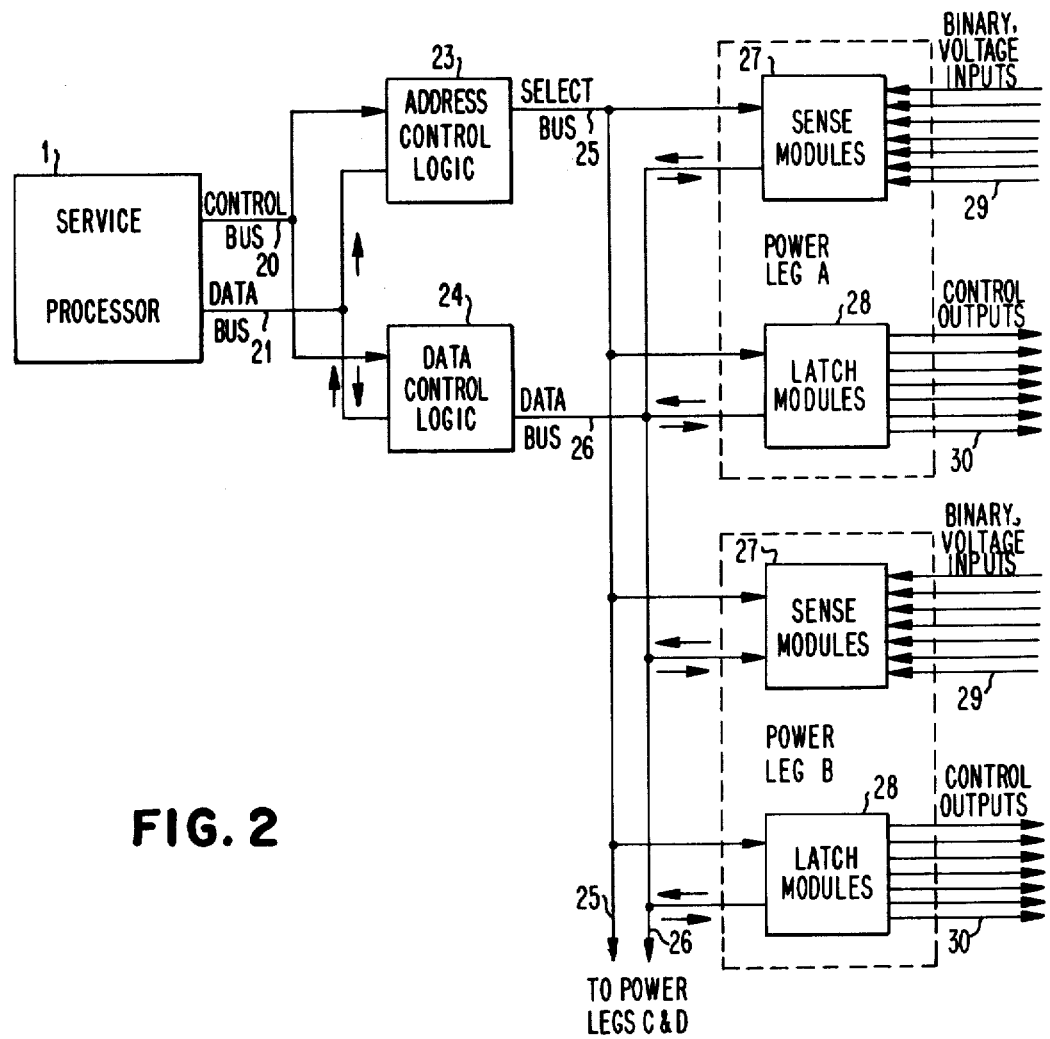
FIG. 2 illustrates the adapter of FIG. 1 in more detail.

FIG. 2 shows the data flow of adapter 7 of FIG. 1 in more detail. An interface unit consists of address control logic 23 and data control logic 24. A control bus 20 takes microprogram control bytes from the service processor 1 to both the address control logic 23 and data control logic 24. A data bus 21 connected to service processor 1 supplies microprogram address data bytes in both directions between service processor 1 and data control logic 24.

From address control logic 23 a select bus 25 fans out to four power legs A, B, C and D and similarly data bus 26 fans out from data control logic 24 to the same four power legs. Each power leg includes sense modules 27 and latch modules 28. Select bus 25 transmits select data to both sense modules 27 and latch modules 28. Data bus 26 transmits data to latch modules 28 and receives data from both sense modules 27 and latch modules 28.

The interface unit contains the logic which controls data flow between the power legs A, B, C, and D and the service processor 1. Shift registers perform serial/Parallel conversion for the serial power service bus 8. Data is routed to/from the appropriate logic. Also included is a facility for sending test bytes around the interface loop to check the logic.

The latch modules 28 drive control outputs 30 to control operation of the power system, and a digital to analog converter 47. The sense modules 27 receive binary inputs 29 from the power system, and analog voltage comparators 45 (see FIG. 3). Service processor 1 scans the binary inputs 29 under microprogram control.

Figure 3:
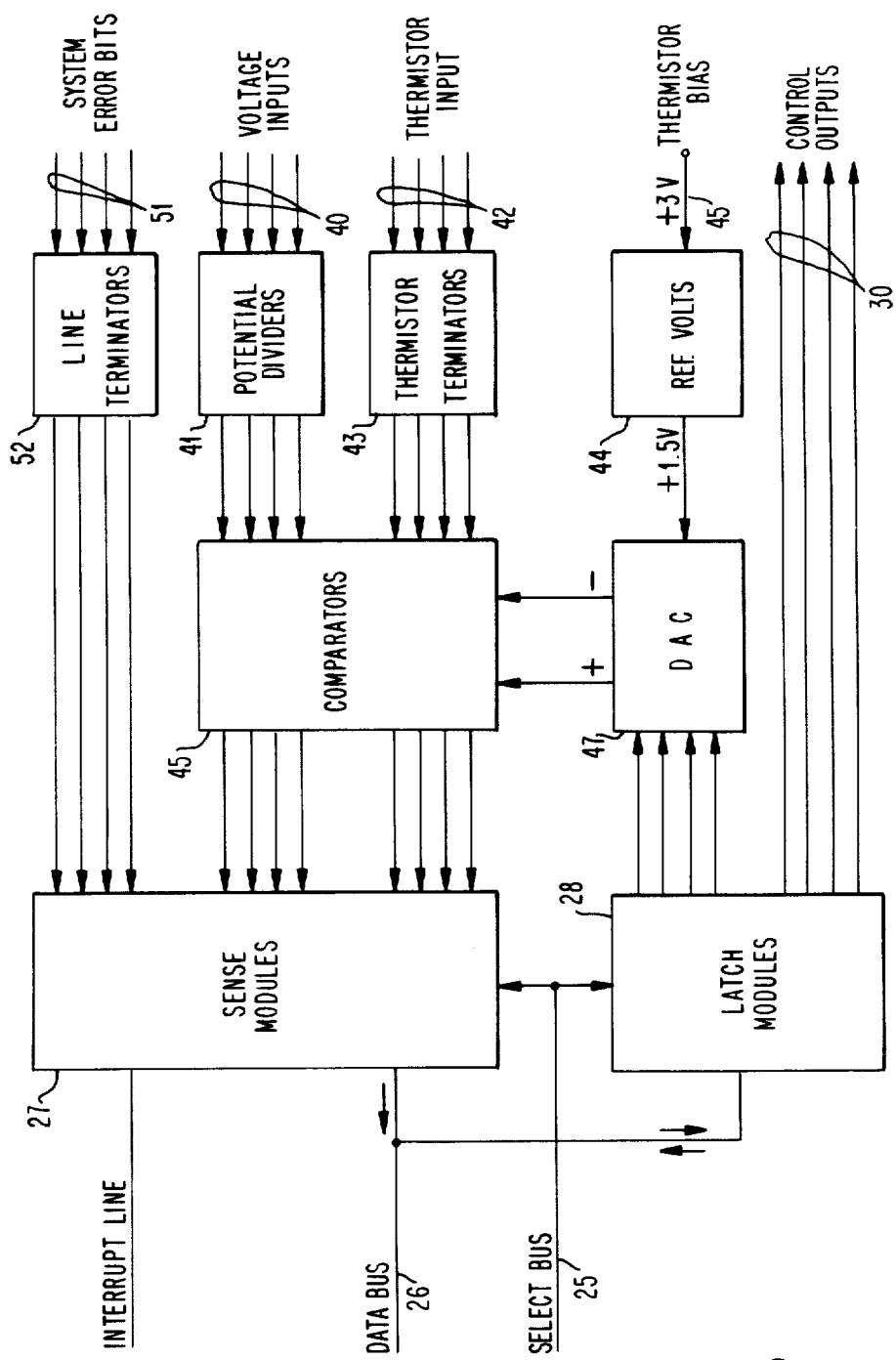
FIG. 3 illustrates schematically a portion of FIG. 2 to show how input voltages are multiplexed.

FIG. 3 illustrates schematically how the analog circuits are integrated into the power control adapter logic, and shows a portion of FIG. 2 in more detail. In general analog voltage inputs are reduced to a nominal 1.5 volts, and are compared to a voltage generated by a digital-to-analog converter 47, programmed from the service processor 1, to produce a binary output.

Power system voltages 40 are wired to potential dividers 41, which are arranged to reduce normal power system voltages to ±1.5 volts. Similarly thermistors 42 measuring temperature in the power system are wired to thermistor terminators 43, which are resistors selected to produce a nominal +1.5 volts. Reference voltage generator 44 supplies a +3 volt reference voltage on line 45 to bias the thermistors.

The nominal 1.5 volts outputs from potential dividers 41 and thermistor terminators 43 are fed to comparators 45. Also supplied to comparators 45 is a positive or negative voltage generated by digital-to-analog converter (DAC) 47. Each individual comparator in comparators 45 includes a high gain amplifier so that a binary output is produced. These binary outputs are scanned by service processor 1 via sense modules 27 under control of select bus 25. DAC 47 is programmed to generate selected reference voltages via latch modules 28.

Digital-to-analog converter (DAC) 47 converts an eight bit byte into two output voltages which are equal in magnitude, but opposite in sign, and requires an input reference voltage of +1.5 volts. Linearity of DAC 47 is better than ±½ (least significant bit) over most of the working range except at output voltages of less than 15% full scale where the linearity is better than ±1 (least significant bit). The output voltage range is 0 to 127.5% the reference voltage. An input code of 11001000 gives an output voltage of 1.500 volts which is obtained by trimming the reference voltage within the range of 1.5 V±1%. Two output amplifiers of unity gain are provided which may be trimmed to give equal positive and negative output voltages. The input code of 11001000 is used as the nominal setting since this results in each least significant bit representing ½% of nominal and provides for a 27.5% margin above the nominal 1.5 volt value.

Each comparator in comparator 45 is required to compare a system voltage normalized to 1.5 volts with the output of DAC 47 and provide a binary output to drive logic circuits. The comparators used have an input offset voltage of 5 mV and input bias current of 10 μA so that errors due to these parameters are less than ±½% during voltage measurement.

Reference voltage generator 44 uses an HK zener diode (6.2 nominal) which is supplied with a constant current by an operational amplifier using the zener diode itself as the reference element determining the current supplied to it. This arrangement has the advantage of providing a highly stable current with a minimum of components. A disadvantage is that the circuit has an unwanted stable position with the zener diode forward biassed together with a desired reverse biassed stable position, so the circuit must include an initial setting arrangement so that the circuit adopts the correct stable state when power is switched on. The circuit generates the zener voltage which is divided down to 1.5 volts using an accurate thin film resistor network. A potentiometer associated with the resistor network provides adjustment capability. An additional operational amplifier is used to provide a +3 volt reference from the +1.5 volt reference as a bias for the thermistor temperature sensors.

The circuitry described enables system voltages to be measured by means of a microprogram in the service processor 1 to the degree of sophistication required. Three voltage checking routines that have been found useful are given in the following three paragraphs:

(a) A voltage tolerance check may be performed simultaneously on many system voltages by programming the DAC 47 output voltage to a low tolerance value, reading back all comparator outputs, and then programming DAC 47 output voltage to a high tolerance level, to check if the comparator outputs change state.

(b) A particular system voltage may be accurately measured by performing a successive approximation routine under microprogram control and reading the appropriate comparator output.

(c) A voltage noise check may be performed, within the bandwidth of the analog circuitry and sampling speed, by programming DAC 47 from a high or low level gradually towards the nominal value until the noise threshold has been reached as defined statistically by the microprogram.

FIG. 3 shows system error bits 51 as inputs to line terminators 52. These error bits are generated by power supplies throughout the power system, thermal switches, and auxiliary switches on contactors, circuit breakers, etc. The error bytes are monitored by the service processor to locate failures.

Two error bytes are ORed to produce a single interrupt bit in order to reduce the time for the service processor to scan the system to check if an error has occurred. As the service processor 1 accepts one eight bit byte at a time, 8 interrupt bits are produced from various areas of the power system so that an indication of the general source of the error is obtained quickly.

One difficulty associated with the present microprogrammed power control system is that the speed of scanning is in general too slow to provide protection against catastrophic overvoltage of a power supply. Thus this protection must be built into each power supply in the system, and this protection is normally provided with commercially available regulator type power supplies.

Another difficulty is that in the event of a failure in service processor 1 or its communication link with power adapter 7, the power system would be left uncontrolled so provision must be made to cope with his possibility. In the present power control system, the presence of error bits 51 starts a timing circuit which defines a timeout period during which an uncorrected error may be allowed to exist. Under normal conditions, service processor 1 will reset the timing circuit. However, if the service processor 1 is inoperative, at the end of the timeout period, the power leg is shut down.

Service Processor Microprograms

The Power System Diagnostic Sequencing and Monitoring Program is designed to check out, power up and monitor the power supply system. The interface between the service processor and the power system is an adaptor which consists of control outputs, logical inputs, analog inputs, comparators and digital-to-analog converters for measurement purposes, interrupt (error) circuitry and hardware controlled protect circuits as described earlier in this specification.

The Power System Diagnostic Sequencing and Monitoring Program consists of four main portions:

1. Power System Diagnostics
2. Power On Sequencing Routine
3. System Monitoring Routine
4. Sub-Routines 1. Power System Diagnostics The Power System Diagnostics consist of some routines which check the power controller for proper operation and read available information from the system to check against expected results.

DIAG 0—This routine monitors the "Power On Switch" and performs a data shift register test with different test patterns after "Power On" is detected. If a data shift register error is found, an error message with actual and expected results will be printed out.

DIAG 1—This routine tests proper operation of latch byte addressing and tests all latch bytes by means of test pattern FF, AA, 55, 00. If an error is detected during latch byte addressing test, an error analysis routine will determine whether it is an address error or a data error. Any detected error will cause an error message with actual and expected results to be printed out.

During execution of this test routine, latches will be set and reset, but the time between set and reset of latches will be so short, that contactors, controlled by latches, will not pick.

DIAG 2—This routine tests proper operation of the "Interrupt Time Out" Circuitry. The following functions are tested:

(a) The "Enable Interrupt Time Out Latch" in reset state will prevent an "Interrupt Time Out" while an interrupt is pending.

(b) The "Enable Interrupt Time Out Latch" in set state will allow an "Interrupt Time Out" while an interrupt is pending. All latch bytes on a power leg will be reset by hardware.

(c) An "Interrupt Time Out" will occur within a certain time after the "Enable Interrupt Time Out Latch" is set while an interrupt is pending.

If an error is detected, a dedicated error message will be printed out.

DIAG 3—This routine tests proper operation of sense byte processing via a diagnostic latch wired to dedicated sense byte inputs. Sense byte circuitry is tested in the zero state by means of test latches. Any detected error will cause an error message with actual and expected results to be printed out. The routine also reads all sense bytes and checks for unexpected system conditions before starting the power on sequence.

2. Power On Sequencing Routine

The Power On Sequencing Routine starts by resetting all system status flags. Then fans and the AC/DC converter are switched on. After each step the program checks the system state or checks for expected system response. The regulators are sequenced up and each regulator voltage is checked after the regulator is turned on and a time delay is executed.

During the regulator on sequence, the system is checked for interrupts (errors).

Voltage checking and measurement, monitoring, time delays and printouts during the Power On Sequencing Routine are performed by certain sub-routines. The block diagram in FIG. 4 gives an example for regulator power on sequencing.

Figure 4:
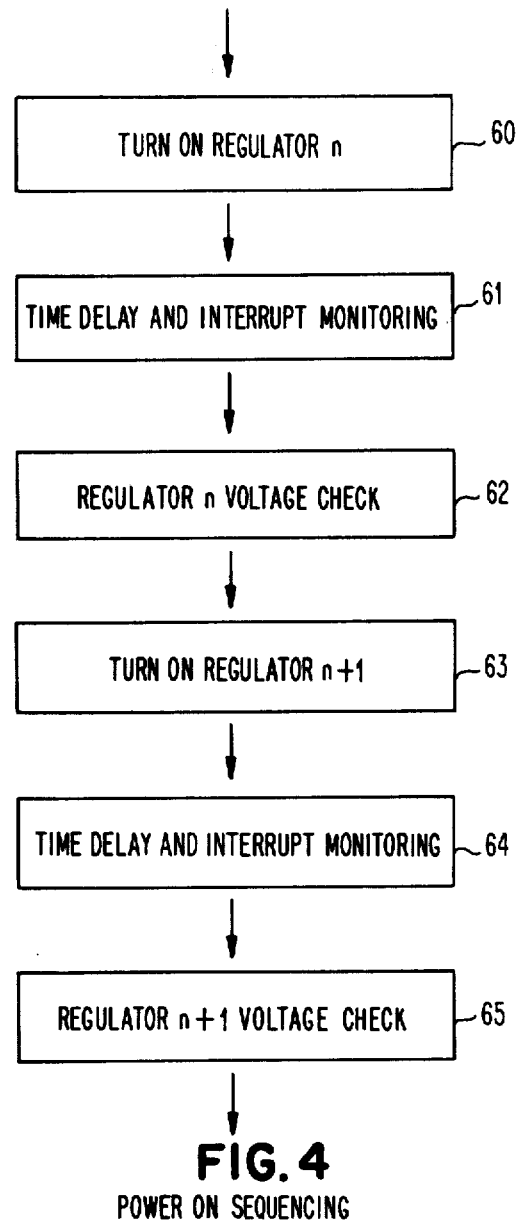
FIG. 4 shows the sequence of steps in a microprogram routine for Power On Sequencing.
Figure 5:
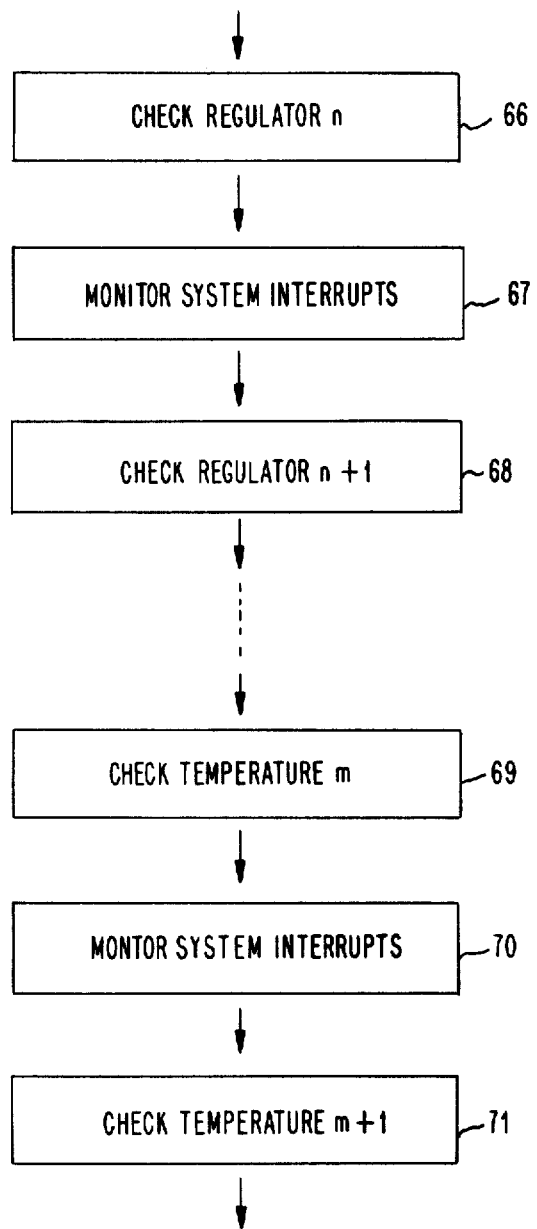
FIG. 5 shows the sequence of steps in a microprogram routine for Power System Monitoring.

In FIG. 4 regulator n is turned on 60, a time delay allowed for interrupt or error monitoring 61 followed by a voltage check 62. This completed, the same series of steps 63, 64 and 65 is repeated for the next regulator n+1.

The Power On Sequencing Routine ends with a "Power On Complete" printout. If the "Power Off Switch" is pressed during the Power On Sequencing Routine, an interrupt will be generated and this case will be handled by the programs subroutines like any other interrupt (for reference see Sub-Routine, INTMON, INTANAL). Further information is provided by section 4, Sub-Routines, below.

Steps 60 and 63 are performed by the Power On Sequencing Routine.

Steps 61 and 64 are initiated by the Power On Sequencing Routine, supported by the following sub-routines: TIMER, INTMON.

If an error is detected the following sub-routines are available: INTANAL, PGPOF, PRDAT, PRTCON.

Steps 62 and 65 are initiated by the Power On Sequencing Routine, supported by the following sub-routines: MESDAT, MESSUB, TLCK, TD.

If an error is detected; the following sub-routines are available: INTANAL, PGPOF, PRDAT, SUAP, HETODE, PRTCON.

The functions of the above sub-routines are described later.

3. System Monitoring Routine

The System Monitoring Routine takes control after "Power On Complete" and consists of a program loop, which checks all the regulator voltages and temperatures and monitors system interrupts. Any error conditions will be printed out.

A manual option feature provided by the MANOPT sub-routine allows a print out of the system voltages and temperatures, to record the system voltages and temperatures over a longer period and to enter an adjust mode if a regulator voltage is too high or too low. A few control statements at the start and the end of the System Monitoring Routine supported by data provided by the MANOPT sub-routine control these operations. The block diagram in FIG. 2 shows a characteristic example of some System Monitoring Operations.

The operations first checks all regulators for example steps 66 and 68 and then checks all temperatures, for example in steps 69 and 71. Between each of these operations, system interrupts are monitored in step 67 and 70. Each operations step is initiated by the System Monitoring Routine.

In the steps 66 and 68, the System Monitoring Routine is supported by the following sub-routines: MESDAT, MESSUB, TLCK, TD, and if an error is detected by: INTANAL, PGPOF, PRDAT, SUAP, HETODE, PRTCON.

In steps 67 and 70 the System Monitoring Routine is supported by the INTMON sub-routine, and if an error is detected, supported by the following sub-routines: INTANAL, PGPOF, PRDAT, PRTCON.

In steps 69 and 71 the System Monitoring Routine is supported by the following sub-routines: MESDAT, THMSUB, TLCK, TD, and if an error is detected: INTANAL, PGPOF, PRDAT, SUAP, HETODE, PRTCON.

4. Sub-Routines

A brief description of the sub-routines used by the Power On Sequencing Routine and System Monitoring Routine follows.

MESDAT (Measurement Data Routine)—This routine contains all necessary information for tolerance checking, measuring and error print out dedicated to every regulator and thermistor.

PRDAT (Print Data Routine)—This routine contains print out phases which are used by various other routines.

MESSUB (Measurement Sub-Routine)—This routine controls checking and measuring of regulator voltages. After an initial 4% tolerance check is performed, further operations are dependent on the result of this tolerance check, 3 system status flags and the result of further tolerance checks.

FIG. 6 shows flow charts for the measurement control depending on the system conditions.

Figure 7A:
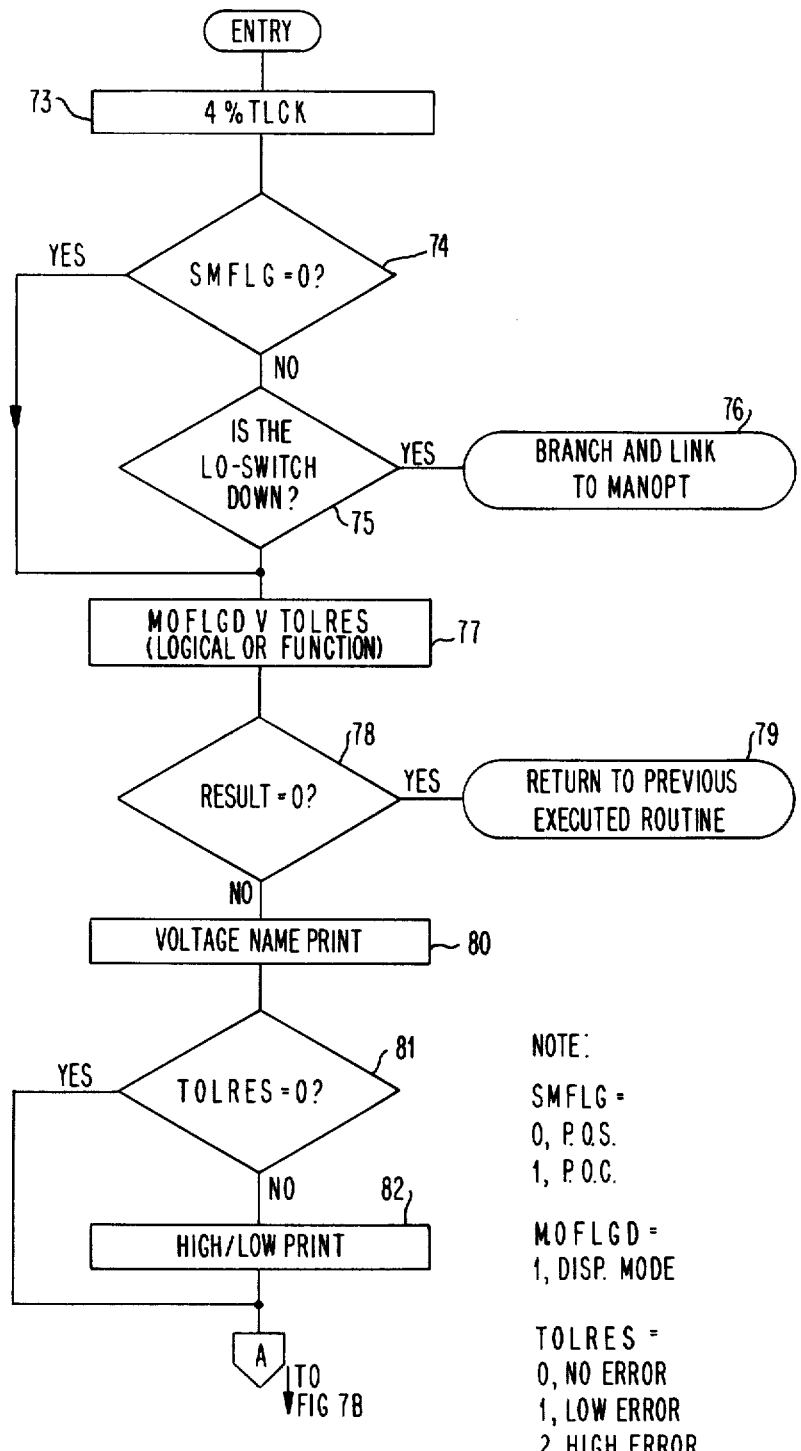
FIG. 7A and FIG. 7B are flow charts of the Measurement Sub-Routine MESSUB.
Figure 7B:
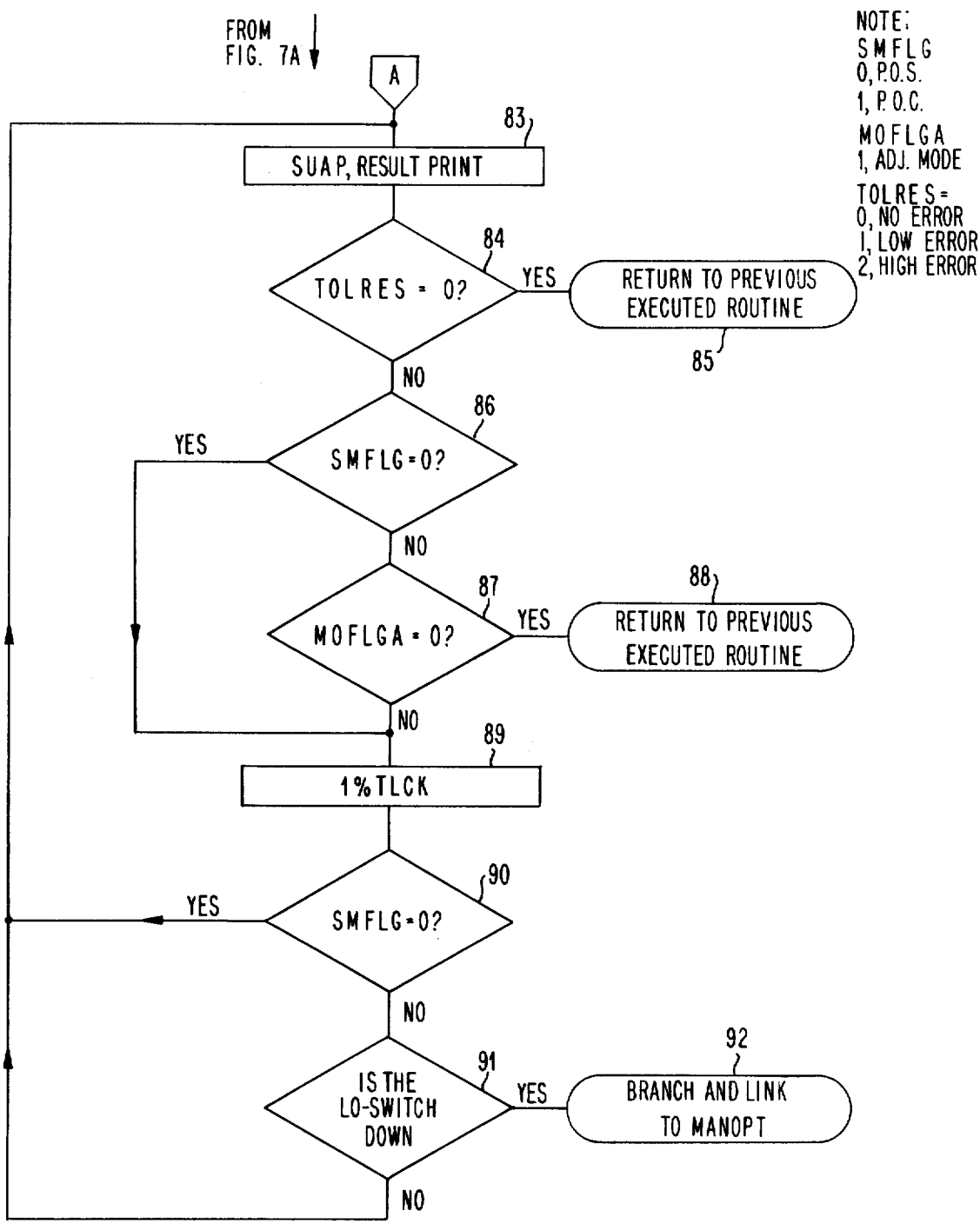

FIGS. 7A and 7B show a brief flow chart of the complete routine. For further information see Sub-Routine Control Examples.

In FIG. 7A, after entry a 4% Tolerance Check Routine 73 is performed. If the System Monitoring Flag 74 is 1 indicating Power On Complete, and the LO switch on the control panel is down 75, the program branches to MANOPT 76 which is a manual option routine described later.

Otherwise the routine continues with a logical OR 77 of MOFLGD as display request bit and TOLRES indicating a voltage error. If the result of the OR 78 indicates there are no errors and display is not requested, the sub-routine returns to the previously executed routine 79. Otherwise the name of the voltage out of tolerance is printed out 80.

Next, if TOLRES indicates a voltage error 81 of more than 4% either High or Low is printed out 82 indicating if the voltage is either above or below the nominal value. The sub-routine MESSUB exits at A to enter at A on FIG. 7B, to perform SUAP, a Successive Approximation Routine, and print the result 83. If TOLRES 84 is 0, indicating that the voltage is within the 4% no errors the program returns to the previous executed routine 85.

Otherwise, if SMFLG 86 indicates Power On Sequence and MOFLGA 87 indicates that adjust mode is not required the program returns to the previous executed routine 88. Alternatively, the next step is that a 1% Tolerance Check TLCK 89 is performed. Lastly if SMFLG 90 indicates Power On Complete and the LO switch 91 is down, there is a branch to MANOPT for manual operation. Alternatively, at both 90 and 91 the routine returns to A.

Figure 9:
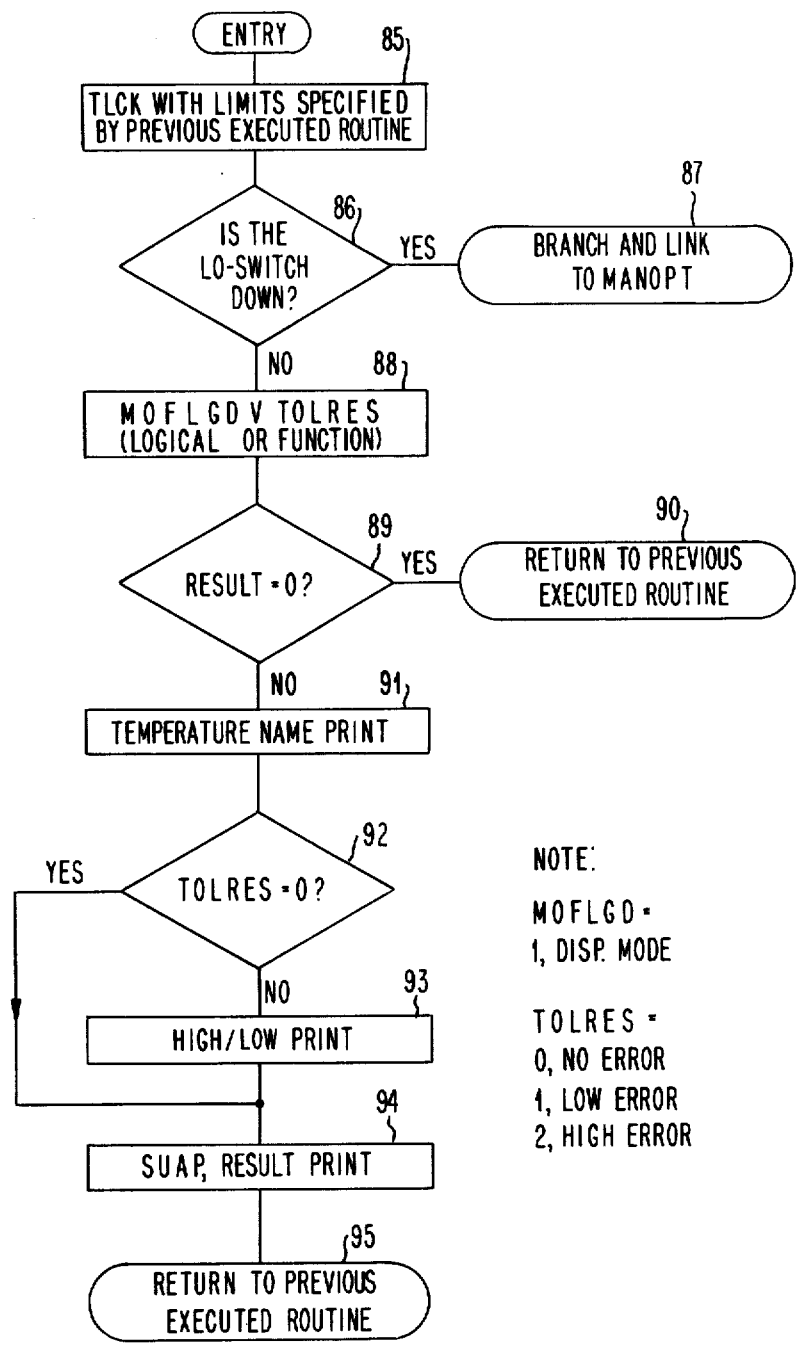
FIG. 9 is a flow chart of the Thermistor Sub-Routine THMSUB for temperature measurement and printing.

THMSUB (Thermistor Measurement Sub-Routine)—This routine controls checking and measurement of temperature sensor voltages. FIG. 8 shows flow charts for the measurement control depending on the system conditions. FIG. 9 shows a brief flow chart of the complete routine.

After Entry there is a Tolerance Check Routine TLCK 85 with specified limits. This is followed by a branch to MANOPT 87 if LO switch 86 is down. If there is an error and the display mode has been requested 88, 89, a temperature name print follows 91. In an error is present 92 a print operation 93 occurs. Finally, a Successive Approximation Routine and print of temperature 94 followed by Return to previous executed routine 95. Other exits are from 86 to manual operation 89 or from 89 to Return to previous routine 90.

PRTCON (Print Conversion Routine)—This routine provides a conversion for a 2×4 bit (1 byte) hexadecimal value to two characters coded to be printable with the Printer. A flow chart of the PRTCON sub-routine is not given as such print routines are well known in the data processing art.

TLCK (Tolerance Check Routine)—This routine provides a tolerance check facility using the power controller's analog circuitry.

The routine has a ±4%, a ±1% and a common entry. The common entry takes previous specified limits for the tolerance check. The tolerance check routine delivers a coded result available in a fixed storage location according to the following table. Note that this table is termed TOLRES and appears in abbreviated form in FIGS. 6, 7A, 7B, 8 and 9

| Code | Result |
| --- | --- |
| 0 | The voltage to be checked is in tolerance |
| 1 | The voltage to be checked is below the lower limit. |
| 2 | The voltage to be checked is above the upper limit. |

Figure 10A:
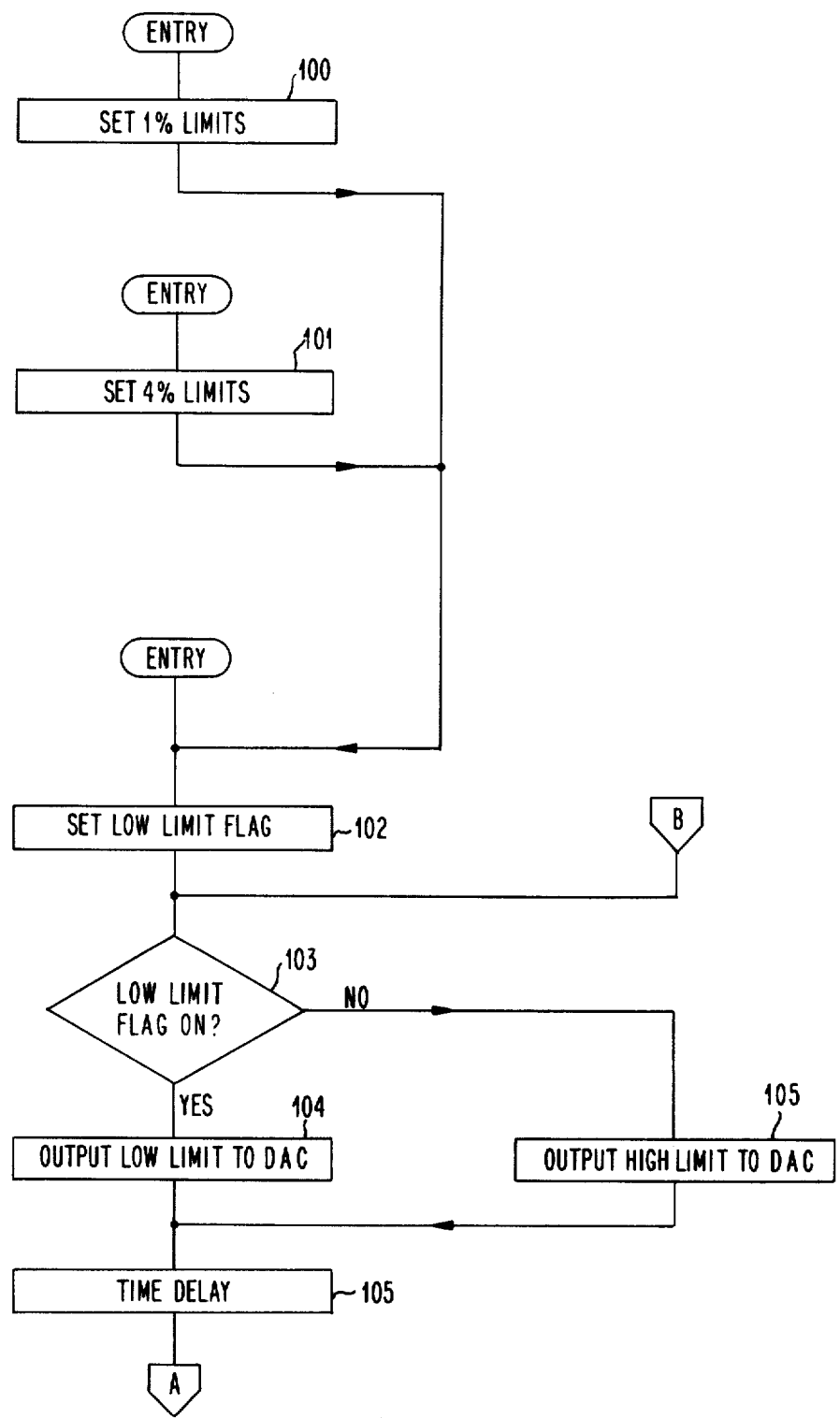
FIGS. 10A and 10B are a flow chart of the Tolerance Check Routine TLK for power system voltages.
Figure 10B:
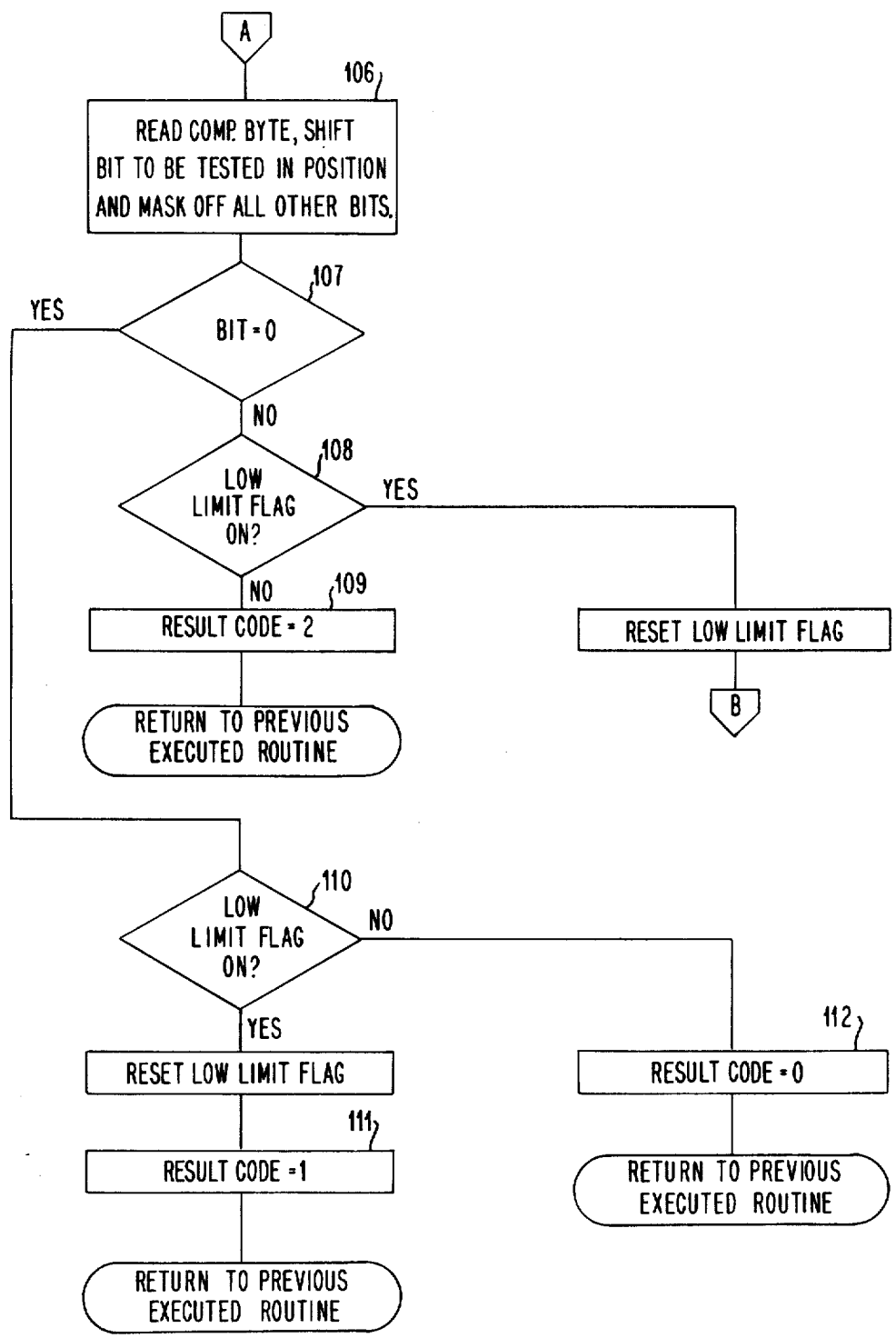

FIGS. 10A and 10B show a flow chart of the tolerance check routine TLCK. The routine TLCK exits from FIG. 10A at A to enter FIG. 10B at A or exits FIG. 10B at B to enter FIG. 10A at B. In FIG. 10A entry is via previously specified limits of 1% at 100 or 4% at 101 or via Set low limit flag 102. If low limit flag 103 is on the digital-to-analog converter (DAC) is set to the low limit 104 or if not to the high limit 105. A time delay 105 follows to allow the DAC and comparators to operate.

The routine continues in FIG. 10B to block 106 which reads one bit of the comparator output which if a "1" at 107 and the low limit flag is not on at 107 gives a result code 2 at 109 indicating the voltage is above the upper limit.

If the bit at 107 is a "0", the routine branches to 110 where low limit flag on 110 gives a branch to either Result code 1 at 111 indicating the voltage is below the lower limit or to Result code 0 at 112 indicating the voltage is within tolerance.

SUAP (Successive Approximation Routine)—This routine provides a successive approximation facility using the power controller's analog circuitry. There are three entries available. A common entry will deliver a 1 byte hexadecimal result stored in a fixed storage location. A percent-entry will cause the hexadecimal successive approximation result to be converted to a percentage and printed on the printer. This entry is used to measure and print out the value of a regulator voltage. A C-entry will cause the hexadecimal successive approximation result to be converted to a value in degrees centigrade. This entry is used to measure and print out temperatures based on measuring a thermistor voltage drop.

HETODE (Hexadecimal to decimal Conversion Routine)—This routine provide a hexadecimal to decimal conversion. The size of the value to be converted is limited by a 4 digit decimal result field.

MANOPT (Manual Option Routine)—This routine can be entered by switching the "LO" switch on the control panel into the down position after "Power On Complete". The following print out requests the operator to type in an option:

ENTER OPTION
A    ADJUST
P    PRINT
D    DISPLAY
C    CANCEL

"A" forces the System Monitoring Routine into a measurement and adjust loop on any regulator voltage out of tolerance. "P" forces the System Monitoring Routine to print out all regulator voltages and system temperatures once. "D" forces the System Monitoring Routine to print out all regulator voltages and system temperatures. The print out will be repeated continuously until it is cancelled by option "C".

TD (10 Micro Second Delay)—This routine consists of a loop of dummy instructions. The time to execute this routine is approximately 10 micro seconds.

TIMER (Time Delay Routine)—This routine provides a programmable time delay in 100 millisecond steps. The factor the 100 millisecond time delay base will be multiplied with has to be stored into a fixed storage location by any routine executed before entering the TIMER sub-routine. The TIMER sub-routine has two entries. If the common entry is used, the program branches to the INTMON sub-routine every 10 milliseconds during execution of the time delay. If the F-entry is used, program controlled interrupt monitoring will not be performed.

INTMON (Interrupt Monitoring Routine)—This routine checks the interrupt byte which is generated by the power legs, and gives control to the INTANAL sub-routine if an interrupt is detected.

INTANAL (Interrupt Analysis Routine)—This routine checks for valid interrupt indication, analyzes the interrupt byte according to a priority chain and takes action to handle the interrupt if possible. Otherwise a branch to the PGPOF sub-routine will be executed and a dedicated message will be printed out on the printer.

PGPOF (Program Controlled Power Off Routine)—This routine switches off the system under microprogram control. There are two entries available. The common entry will cause the program to branch to the power on switch monitoring loop and when this is completed, leave the program set to use DIAGO at Power On.

Some Sub-Routine Control Examples

Example 1—Power On Sequencing

Figure 11:
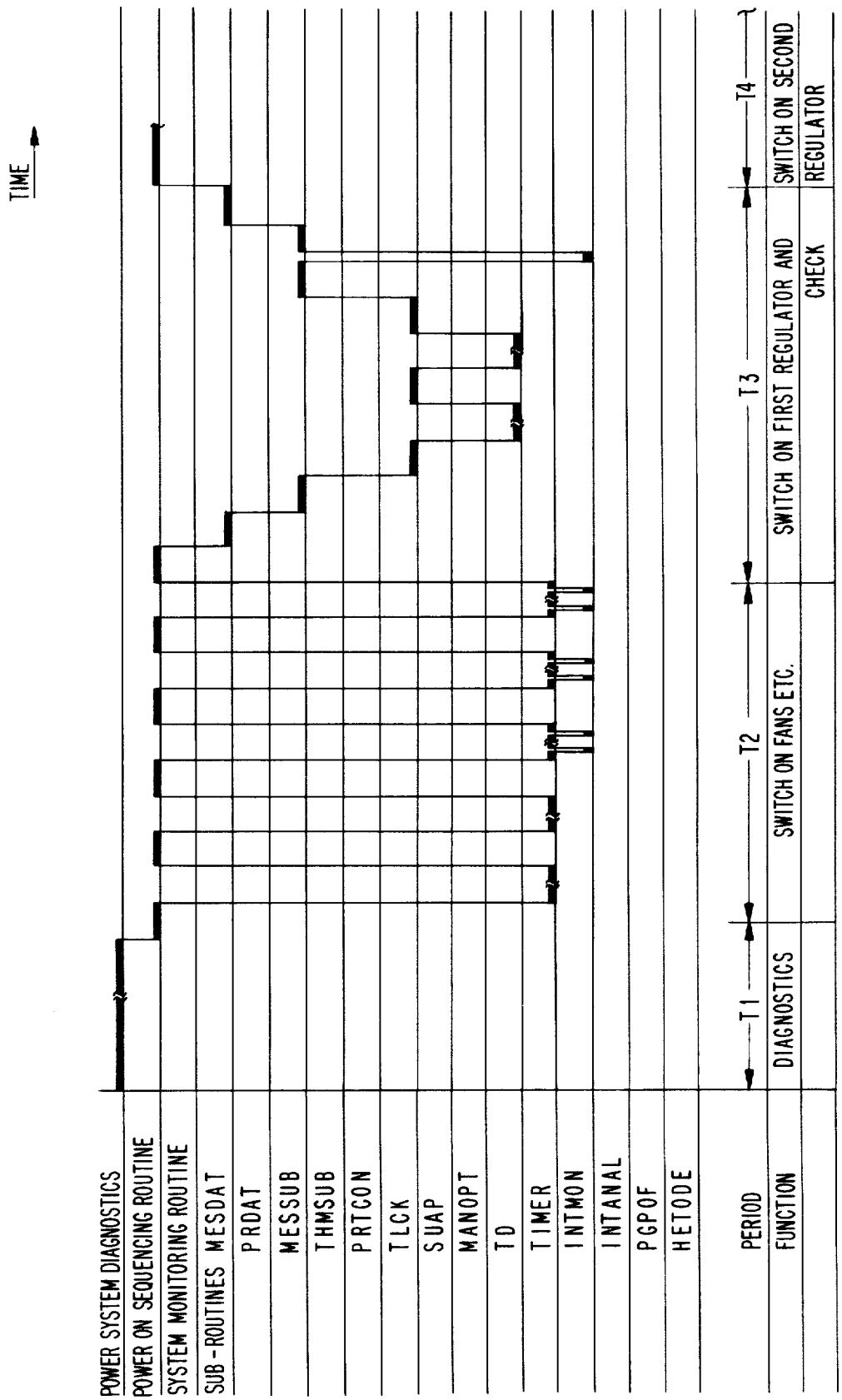
FIG. 11 is a chart illustrating power on sequencing.

FIG. 11 is a chart illustrating the routine sequence used to perform power on sequencing. Routines and sub-routines previously described are listed vertically on the left hand side of the chart. The horizontal axis represents time. A thick horizontal line against a routine indicates that the routine is being performed.

During period T1, the power controller is checked for proper operation. When the system diagnostics are completed, period T2 starts. During this period, the Power On Sequencing Routine is performed, fans, circuit breakers and the AC/DC converter being switched on in sequence with time intervals controlled by TIMER and checks for errors by INTMON.

At the start of period T3, the first regulator is switched on, followed by the voltage checking sub-routines shown. The sequencing continues at the beginning of period T4 by switching on the second regulator. Similar sequencing steps follow until all power supplies in the system are switched on and checked.

Example 2—System Monitoring with one voltage out of tolerance

Figure 12:
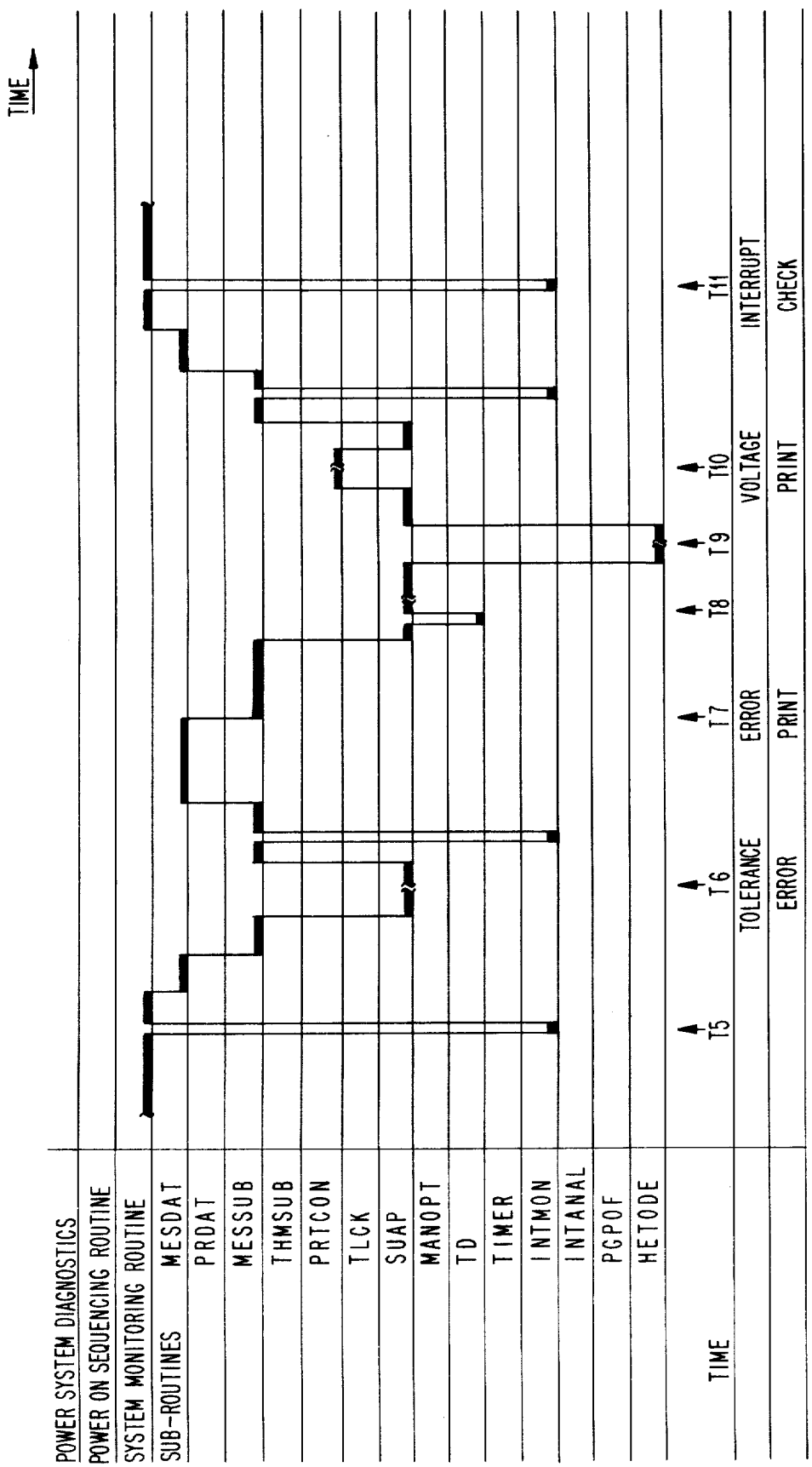
FIG. 12 is a chart illustrating system monitoring with one voltage out of tolerance.

FIG. 12 shows system monitoring with one voltage out of tolerance. The sequence starts in the System Monitoring Routine with a check for interrupts at T5. At T6 TLCK sub-routine performs a 4% tolerance check and we assume that one voltage is found to be out of tolerance. MESDAT supplies the information required for error printout and a regulator voltage error printout occurs at T7. This is followed by SUAP successive approximation sub-routine to measure the regulator voltage which is converted to hexadecimal at T9 and printed at T11. The sequence then continues system monitoring with an interrupt check at T11.

Example 3—System Monitoring with adjust mode

Figure 13:
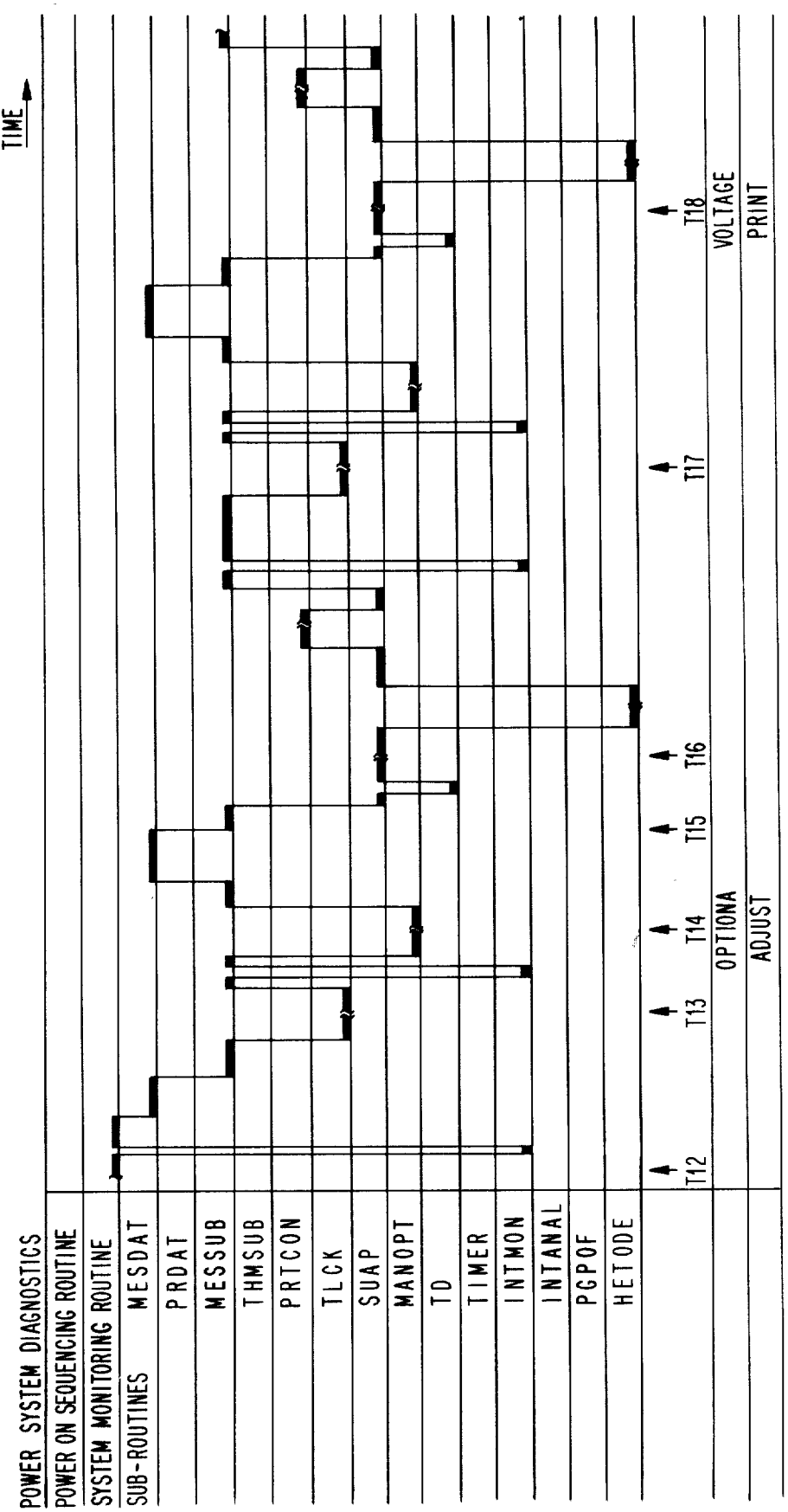
FIG. 13 is a chart illustrating system monitoring with one voltage out of tolerance and adjust mode to enable manual adjustment.

FIG. 13 shows system monitoring with manual adjustment of one voltage. At time T12 the System Monitoring Routine is being performed and it is assumed that the LO switch is down. A 4% tolerance check is at T13. If option A Adjust is entered on the keyboard, this option is implemented by MANOPT at T14 and the System Monitoring Routine is forced into a measurement and adjust loop. A voltage level can now be adjusted with regulator voltage printout at T15 accompanies by successive approximation with result conversion and voltage printout at T16 and T18 and a 1% tolerance check at T17. This enables manual adjustment of a regulator accompanied by printout of the voltage as it is adjusted.

Example 4—System Monitoring with circuit breaker trip

Figure 14:
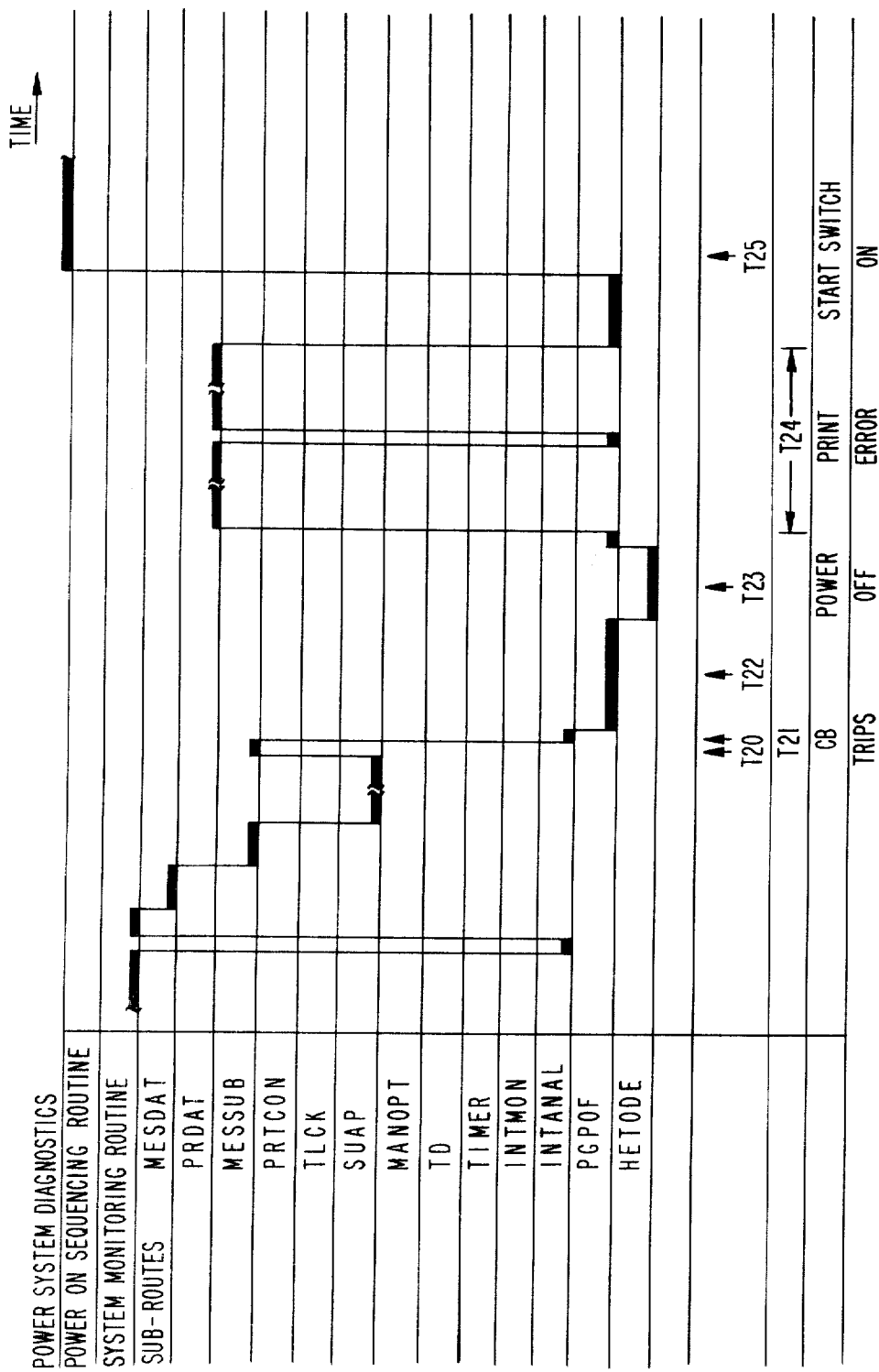
FIG. 14 is a chart illustrating a circuit breaker trip interrupt during system monitoring routine.
Figure 15:
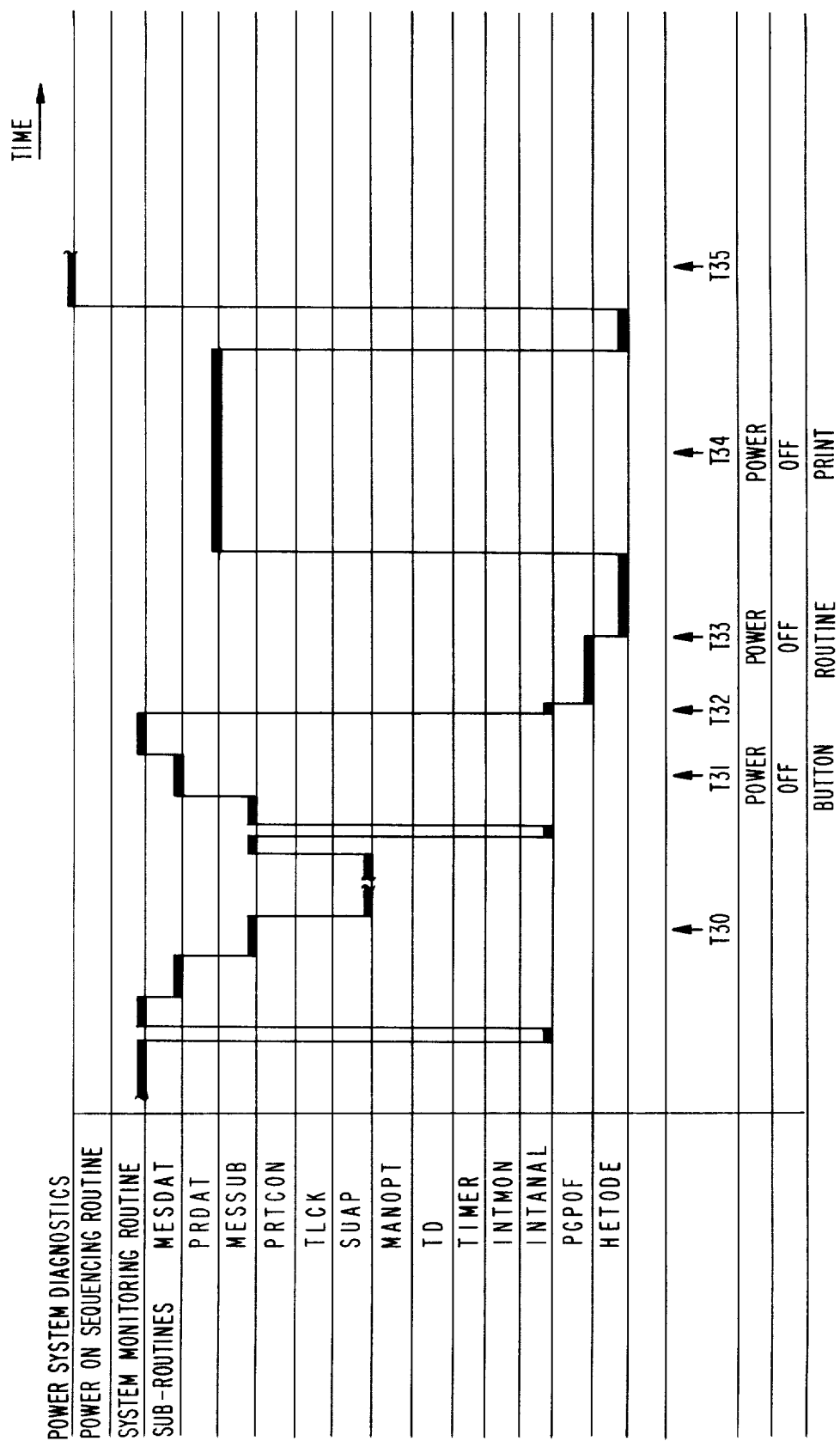
FIG. 15 is a chart illustrating normal power off during system monitoring routine.

FIG. 14 starts during a System Monitoring Routine. It is assumed that a circuit breaker trips at T20. This is detected by INTMON at T21 which branches to INTANAL at T22 to analyze the interrupt caused by the circuit breaker tripping. This results in the PGPOF (Program Controlled Power Off) routine at T23 which switches the power off. An error message is printed out by PRDAT during period T24. Finally at T25, the program enters a power on switch monitoring loop.

Example 5—Normal Power Off

The System Monitoring Routine is in progress and at time T30 sub-routine TLCK is checking a regulator voltage. At T31, the Power Off button is pressed. This is treated as an interrupt by INTMON at T32 which gives control to the INTANAL sub-routine. The sub-routine branches to PGPOF which sequences the power off and "Power Off" is printed by PRDAT at T34. Finally at T35, the program enters the power on switch monitoring loop.

As illustrated in FIG. 1, power supply 15 is not under the control of the service processor. Power supply 15 can be of any conventional design, but it is preferred that it have high reliability and require a minimum of control for its own operation. For example, a simple ferro-ressonant transformer, rectifier, filter arrangement or other conventional, highly reliable supply can be used for this purpose. Thus it is assured that start up power will be available immediately upon application of power to the system.

While the invention has been particularly shown and described with reference to a preferred embodiment thereof, it will be understood by those skilled in the art that various changes in form and detail may be made therein without departing from the spirit and scope of the invention.

What is claimed is:

1. Data processing apparatus including a service subsystem and a plurality of other subsystems having service link communication with said service subsystem and including at least one processing subsystem, a plurality of power supply units to provide electrical power to respective ones of said other subsystems, and power supply means dedicated to provide electrical power to enable the service subsystem to start up, the service subsystem including an adapter and a microprogram controlled processor having address and data bus means connected to said adapter, said power control adapter unit being connected between said processor and said power supply units and including measuring and logic curcuits operable under the control of said processor to provide data collection from and data distribution to said plurality of power supply units, said service subsystem also including a power control microprogram storage arranged in operation of the service subsystem to control and monitor said plurality of power supply units by operation of said processor and said adapter.

2. Data processing apparatus comprising a service subsystem and a plurality of other subsystems having service link communication with said service subsystem and including at least one processing subsystem, a plurality of power supply units to provide electrical power to respective ones of said other subsystems, and power supply means dedicated to provide electrical power to enable the service subsystem to start up, the service subsystem including a microprogram control unit comprising microprogram storage means and a processor responsive thereto, a power control adapter including address means controlled by said processor, and measuring and logic circuits connected to said power supply units selected by said address means for collecting data from said plurality of power supply units and issuing control signals thereto, said processor operating under a power control microprogram from said storage cooperate with said measuring and logic circuits to control and monitor said plurality of power supply units.

3. Apparatus as claimed in claim 2 in which said power control adapter includes means to collect analog and digital data from said plurality of power supply units and to distribute digital data to said plurality of power supply units and to communicate digitally with the remainder of the service subsystem, said means to collect and distribute comprising a plurality of circuits for receiving analog data and status bits from said power supply units, a plurality of circuits for transmitting control data to said power supply units, and address and data control logic responsive to said processor for cooperating with said power control microprogram to multiplex the receiving and transmission of data.

4. Apparatus as claimed in claim 2 in which said measuring circuits comprise means to normalize analog voltages, means to compare the normalized voltages with reference voltages to generate difference voltages and means to convert the difference voltages to digital values.

5. Apparatus as claimed in claim 4 comprising a digital to analog converter connected to generate said difference voltages under the control of said power control microprogram to produce said digital values.

6. Apparatus as claimed in claim 5 in which said measuring circuits receive power supply voltages and voltages representing temperature from thermistors.

7. Apparatus as claimed in claim 2 in which in operation said power control microprogram sequences the turn-on and turn-off of said plurality of power supply units.

8. Apparatus as claimed in claim 2 in which in operation said power control microprogram monitors voltage levels of said plurality of power units.

9. Apparatus as claimed in claim 2 in which in operation said power control microprogram monitors termperatures.

10. Apparatus claimed in claim 2 in which in operation said power control microprogram checks the correct operation of said measuring and logic circuits.

* * * * *